United States Patent
Chang

(10) Patent No.: US 12,494,024 B2
(45) Date of Patent: Dec. 9, 2025

(54) EXPERIENCE SHARING SYSTEM AND METHOD THEREOF

(71) Applicants: HYUNDAI MOTOR COMPANY, Seoul (KR); Kia Corporation, Seoul (KR)

(72) Inventor: Kyoung Jin Chang, Suwon-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 273 days.

(21) Appl. No.: 18/200,111

(22) Filed: May 22, 2023

(65) Prior Publication Data
US 2024/0037867 A1   Feb. 1, 2024

(30) Foreign Application Priority Data
Jul. 29, 2022   (KR) .................. 10-2022-0094843

(51) Int. Cl.
  G06T 19/00    (2011.01)
  G06F 3/16     (2006.01)
  G06V 10/764   (2022.01)
  G06V 20/20    (2022.01)

(52) U.S. Cl.
  CPC ............ *G06T 19/006* (2013.01); *G06F 3/167* (2013.01); *G06V 10/764* (2022.01); *G06V 20/20* (2022.01); *G06T 2219/024* (2013.01)

(58) Field of Classification Search
  CPC . G06T 19/006; G06T 2219/024; G06F 3/167; G06V 10/764; G06V 20/20; G06V 10/94; G06V 10/95; G06V 40/174
  See application file for complete search history.

(56) References Cited

U.S. PATENT DOCUMENTS

| | | | |
|---|---|---|---|
| 10,055,887 B1* | 8/2018 | Gil .................... | G06F 1/163 |
| 10,769,797 B2 | 9/2020 | Budagavi et al. | |
| 2017/0243403 A1* | 8/2017 | Daniels .............. | G06F 3/1454 |
| 2018/0189958 A1 | 7/2018 | Budgavi et al. | |
| 2020/0110264 A1 | 4/2020 | Nanasawa et al. | |

(Continued)

FOREIGN PATENT DOCUMENTS

| | | |
|---|---|---|
| JP | 2020-61118 A | 4/2020 |
| KR | 10-2017-0081456 A | 7/2017 |

(Continued)

*Primary Examiner* — Grace Q Li
(74) *Attorney, Agent, or Firm* — MORGAN, LEWIS & BOCKIUS LLP

(57) ABSTRACT

An experience sharing system for sharing an experience with others using VR and a method thereof includes a VR recorder that records a surrounding environment image, a user response image, and a surrounding sound of a first user to generate experience content, a VR player that plays and provides the experience content to a second user, and a data processing device connected to the VR recorder and the VR player over a communication network. The data processing device pre-analyzes the experience content received from the VR recorder to classify a category, adds an image matched with the classified category to the experience content, stores the experience content to which the image is added in a DB, and accesses the experience content from the DB depending on a request of the VR player and transmits the accessed experience content to the VR player.

21 Claims, 14 Drawing Sheets

(56) References Cited

U.S. PATENT DOCUMENTS

| | | | | |
|---|---|---|---|---|
| 2020/0202979 | A1* | 6/2020 | Apte | G16B 40/20 |
| 2020/0265613 | A1* | 8/2020 | Yoon | G06F 18/22 |
| 2021/0056758 | A1 | 2/2021 | Yerli | |
| 2022/0272133 | A1 | 8/2022 | Jeon | |
| 2022/0384027 | A1* | 12/2022 | Kaleal, III | A61B 5/11 |
| 2024/0181349 | A1* | 6/2024 | Lee | A63F 13/35 |
| 2024/0273835 | A1* | 8/2024 | Gustafsson | G06F 3/017 |

FOREIGN PATENT DOCUMENTS

| | | |
|---|---|---|
| KR | 10-2019-0071839 A | 6/2019 |
| KR | 10-2020-0003291 A | 1/2020 |
| KR | 10-2021-0004862 A | 1/2021 |

\* cited by examiner

EXPERIENCE SHARING SYSTEM AND METHOD THEREOF

CROSS-REFERENCE TO RELATED APPLICATION

The present application claims priority to Korean Patent Application No. 10-2022-0094843, filed on Jul. 29, 2022, the entire contents of which is incorporated herein for all purposes by this reference.

BACKGROUND OF THE PRESENT DISCLOSURE

Field of the Present Disclosure

The present disclosure relates to an experience sharing system for sharing experiences with others using virtual reality (VR).

Description of Related Art

With the development of technologies such as virtual reality (VR) and metaverse, interest in immersive experience capable of interacting with others in a virtual environment, that is, hyper reality experience has increased. Because a head mounted display (HMD) which is an existing representative VR system is able to provide only a virtual environment designed by a maker, an environment that a user may experience is limited and it is impossible to record an environment that the user separately experiences and share a recording with other users.

Furthermore, an image viewing device such as audio, video, navigation (AVN) for vehicle simply play the recorded image and may not realistically play an image and a sound to look together from the viewpoint of the third party in the recorded image.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an experience sharing system for sharing experiences of users as the user such as a famous star or an influencer records his or her wonderful experiences in a special place (or a specific place) and other users receive and play the recording and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an experience sharing system may include a virtual reality (VR) recorder that records a surrounding environment image, a user response image, and a surrounding sound of a first user using a camera and a microphone to generate experience content, a VR player that plays and provides the experience content to a second user, and a data processing device connected to the VR recorder and the VR player over a communication network. The data processing device may pre-analyze the experience content received from the VR recorder to classify a category, may add an image matched with the classified category to the experience content, may store the experience content to which the image is added in a database (DB), and may access the experience content from the DB depending on a request of the VR player and transmits the accessed experience content to the VR player.

The user response image may include at least one of a facial expression or an operation of the first user.

The surrounding sound may include a surrounding environment sound and a voice of the first user.

The VR recorder may add unique information of the first user to the experience content.

The data processing device may classify a season and a place type using an artificial intelligence (AI) algorithm.

The image may include a three-dimensional (3D) image for at least one of a crowd, a building, or a natural environment.

The VR player may transmit experience content selection information, first option selection information, and second optional selection information by the second user to the data processing device. The data processing device may correct the surrounding environment image and the surrounding sound of the experience content based on the first option selection information and the second option selection information and may transmit the corrected experience content to the VR player.

The first option selection information may include information associated with at least one of a weather change, a time change, or background sound addition. The second option selection information may include information associated with background addition.

The experience sharing system may further include a transaction server that registers the experience content as content for sale depending on a request of the data processing device.

The experience sharing system may further include a non-fungible token (NFT) transformation server that transforms the experience content registered as the content for sale into an NFT and may digitally assetize the transformed NFT depending on a request of the transaction server.

According to another aspect of the present disclosure, an experience sharing method may include recording, by a virtual reality (VR) recorder, a surrounding environment image, a user response image, and a surrounding sound of a first user using a camera and a microphone to generate experience content, transmitting, by the VR recorder, the experience content to a data processing device, pre-analyzing, by the data processing device, the experience content received from the VR recorder to classify a category, adding, by the data processing device, an image matched with the classified category to the experience content, storing, by the data processing device, the experience content to which the image is added in a database (DB), accessing, by the data processing device, the experience content from the DB depending on a request of a VR player and transmitting, by the data processing device, the accessed experience content to the VR player, and playing and providing, by the VR player, the experience content to a second user.

The user response image may include at least one of a facial expression or an operation of the first user.

The surrounding sound may include a surrounding environment sound and a voice of the first user.

The generating of the experience content may include adding, by the VR recorder, unique information of the first user to the experience content.

The classifying of the category may include classifying, by the data processing device, a season and a place type using an AI algorithm.

The image may include a 3D image for at least one of a crowd, a building, or a natural environment.

The transmitting to the VR player may include transmitting, by the VR player, experience content selection information, first option selection information, and second option selection information by the second user to the data processing device, correcting, by the data processing device, the surrounding environment image and the surrounding sound of the experience content based on the first option selection information and the second option selection information, and transmitting, by the data processing device, the corrected experience content to the VR player.

The first option selection information may include information associated with at least one of a weather change, a time change, or background sound addition. The second option selection information may include information associated with background addition.

The experience sharing method may further include registering, by the data processing device, the experience content as a content for sale with a transaction server.

The experience sharing method may further include requesting, by the transaction server, a non-fungible token (NFT) transformation server to digitally assetize the experience content registered as the content for sale and transforming, by the NFT transformation server, the experience content registered as the content for sale into an NFT.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
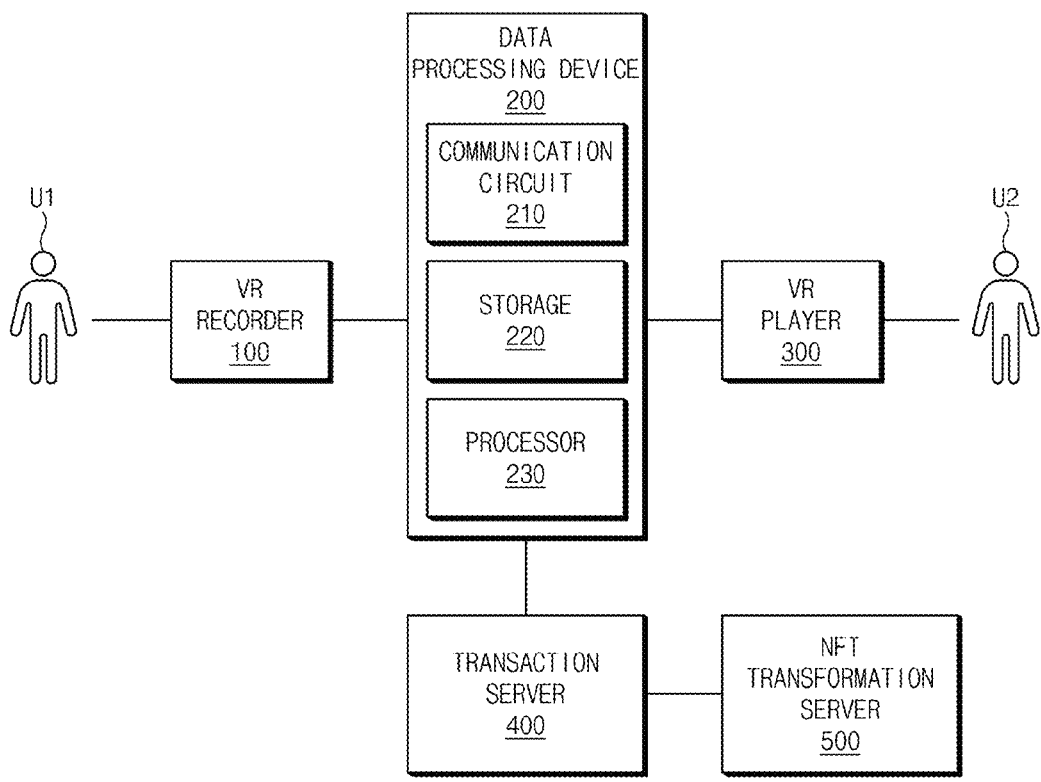
FIG. 1 is a drawing illustrating a configuration of an experience sharing system according to various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, the same reference numerals will be used throughout to designate the same or equivalent elements. Furthermore, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present disclosure relates to a technology for sharing experience content in which a user such as a famous star or an influencer records his or her experience in a specific place with other users. The experience content may be one of products for entertainment, which use a metaverse in future mobility. Due to the sharing of the experience content, it is possible to use the experience content in everyday life and it is possible to use the experience content while the user rests inside the autonomous vehicle. It is possible to develop a product which provides a racing experience file or the like by embedding an experience content sharing technology in the vehicle.

FIG. 1 is a drawing illustrating a configuration of an experience sharing system according to various exemplary embodiments of the present disclosure.

In an exemplary embodiment of the present disclosure, a description will be provided of an example of sharing experience content of a first user U1 with a second user U2. The first user U1 may be a famous actor/actress, a famous singer, a famous sports star, an influencer, or the like. The second user U2 may be a general user, which may be a supporter of the first user U1.

Referring to FIG. 1, the experience sharing system may include a virtual reality (VR) recorder 100, a data processing device 200, a VR player 300, a transaction server 400, and a non-fungible token (NFT) transformation server 500, which are connected over a communication network (e.g., a wireless communication network, a wired communication network, a mobile communication network, or the like).

The VR recorder 100 may record information such as a surrounding environment image (or a background image), a surrounding sound, a response image of the first user U1, and the like while the first user U1 performs a new experience in a specific place (e.g., Cheomseongdae, Gyeongbokgung Palace, or the like). The surrounding sound may include a surrounding environment sound (or a background sound), a voice of the first user U1, and the like. The VR recorder 100 may generate experience content using a recording (or a recording file). The experience content may include unique information of the first user U1 other than the surrounding image information, the surrounding sound information, and the response image information of the first user U1. Herein, the unique information may be information for identifying the first user U1. The VR recorder 100 may output the generated experience content to the data processing device 200.

The data processing device 200 may allow the first user U1 to upload and store his or her recording file in the data processing device 200. In other words, the data processing device 200 may receive the experience content transmitted from the VR recorder 100 and may store the received experience content in a database (DB). The data processing device 200 may correct an image and a sound of the recording file (i.e., the experience content of the first user U1) depending on an option selected by the second user U2. Such a data processing device 200 may include a communication circuit 210, storage 220, a processor 230, and the like.

The communication circuit 210 may support wired and wireless communication of the data processing device 200 with the VR recorder 100, the VR player 300, and/or the transaction server 400. The communication circuit 210 may include a wireless communication circuit (e.g., a Wi-Fi communication circuit, a Bluetooth communication circuit, a near field communication (NFC) circuit, a mobile communication circuit, and/or the like), a wired communication circuit (e.g., a local area network (LAN) communication circuit, an Ethernet communication circuit, an integrated services digital network (ISDN) communication circuit, and/or the like), and/or the like.

An experience content DB may be implemented in the storage 220. The storage 220 may store a pre-trained artificial intelligence (AI) algorithm, a pre-analysis module, and a real-time analysis module. Herein, the pre-analysis module and the real-time analysis module may be software modules, which may be executed by the processor 230. The storage 220 may be a non-transitory storage medium which stores instructions executed by the processor 230. The storage 220 may be implemented as at least one of storage media (recording media) such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), a removable disk, or web storage.

The processor 230 may control the overall operation of the data processing device 200. The processor 230 may be implemented as at least one of processing devices such as an application specific integrated circuit (ASIC), a digital signal processor (DSP), a programmable logic device (PLD), a field programmable gate array (FPGA), a central processing unit (CPU), a microcontroller, or a microprocessor.

The processor 230 may receive the experience content of the first user U1, which is transmitted from the VR recorder 100, through the communication circuit 210. The processor 230 may receive experience content generated based on the surrounding environment image and the user response image recorded by the VR recorder 100 and the surrounding sound recorded by the VR recorder 100. The processor 230 may store the received experience content in the storage 220.

The processor 230 may pre-analyze the surrounding environment image in the experience content to classify a category. The processor 230 may perform a pre-analysis using the pre-trained AI algorithm. A deep learning algorithm such as a single shot detector (SSD) algorithm, a you only look once (YOLO) algorithm, and/or a regional convolutional neural networks (CNN) algorithm may be used as the AI algorithm. The processor 230 may classify a season, a place type, and the like in the surrounding environment image by a pre-analysis of the surrounding environment image (or the background screen of the experience content). Herein, the place type may be classified as a snow-capped mountain, a green mountain, a rocky mountain, a field, a city, a beach, a riverside, or the like. As an exemplary embodiment of the present disclosure, the processor 230 may catch objects (e.g., a tree, a building, a vehicle, and the like) in the image using the deep learning algorithm, may analyze features of the objects, and may classify a place type based on the analyzed result. As an exemplary embodiment of the present disclosure, the processor 230 may identify a surrounding object in the image using the deep learning algorithm and may learn in advance which season the surrounding object is related to, thus classifying a season using the learned result.

The processor 230 my select a three-dimensional (3D) image matched with the classified category from a 3D image DB and may add the selected 3D image to the experience content. The processor 230 may select a 3D image including a crowd dressed in clothing suitable for the classified season and place, a building suitable for the classified place, or a natural environment element suitable for the classified season and/or place and may add the selected 3D image to the experience content. The processor 230 may store the experience content to which the selected 3D image is added in the experience content DB in the storage 220.

The processor 230 may remove an image of the VR recorder 100 of the user from the user response image in the experience content. The processor 230 may store the experience content in which the image of the VR recorder 100 of the user is removed in the storage 220.

The processor 230 may receive experience content selection information of the second user U2, which is transmitted from the VR player 300. The processor 230 may access experience content of the first user U1, which is selected by the second user U2, from the experience content DB in the storage 220.

The processor 230 may receive first option selection information from the VR player 300 of the user. Herein, the first option selection information may include weather change information, time change information, background sound addition information (or surrounding sound addition information), and/or the like. The processor 230 may modify (or correct) the surrounding environment image and the surrounding sound in the experience content based on the first option selection information.

When the first option selection information is the weather change information, the processor 230 may correct a surrounding environment image depending on a weather type, weather intensity, and/or the like included in the weather change information. When the weather type is sunny or cloudy, the processor 230 may determine a brightness of the entire screen depending on the shape, intensity, and the like of sunlight and may add the shape of sunlight to correct a surrounding environment image. When the weather type is rain, wind, and/or fog, the processor 230 may determine an object image matched with the weather type and a frequency proportional to the selected intensity (e.g., 0% to 100%). The processor 230 may add the object image on the surrounding environment image based on the frequency and may play the added object image in a moving form.

When the first option selection information is the time change information, the processor 230 may determine a brightness of the entire screen over the selected time included in the time change information and may correct a brightness of the surrounding environment image depending on the determined brightness. For example, the processor 230 may determine screen brightness to be relatively high, when a daytime zone is selected, and may determine the screen brightness to be relatively low, when a night time zone is selected.

When the first option selection information is the background sound addition information, the processor 230 may determine a previously stored sound source according to a background sound type (e.g., a sound of thunder, a sound of rain, or the like) included in the background sound addition information.

The processor 230 may correct and prepare the surrounding environment image in real time based on the first option selection information. Furthermore, the processor 230 may prepare a background sound source to be added to the experience content in real time.

The processor 230 may receive second option selection information from the VR player 300. The second option selection information may be selected by the user, which may include additional background information such as a crowd, a building, and/or a natural environment (or a natural environment element). The processor 230 may arrange a 3D image based on the second option selection information on the surrounding environment image of the experience content using the AI algorithm. In other words, the processor 230 may arrange 3D image(s) of a crowd, a building, and/or a natural environment according to the second option selection information on the surrounding environment image.

In detail, when adding the 3D image of the crowd, the processor 230 may analyze a season of a surrounding environment image (or an original background screen) of the experience content using the AI algorithm and may determine types of clothes (e.g., summer clothes or winter clothes) of a crowd. Furthermore, the processor 230 may analyze a place of the surrounding environment image using the AI algorithm and may additionally determine types of clothes (e.g., mountaineering clothes, ski clothes, swimwear, work clothes, or the like) depending on the analyzed result. The processor 230 may read a 3D image of the crowd wearing the determined clothes from the previously stored DB.

As an exemplary embodiment of the present disclosure, when adding the 3D image of the building, the processor 230 may analyze a place of the surrounding environment image using the AI algorithm and may determine a shape (e.g., a pension, a hut, an apartment, a building, or the like) of the building depending on the analyzed result. The processor 230 may access a 3D image of a building matched with the determined building shape from the previously stored DB.

As an exemplary embodiment of the present disclosure, when adding the natural environment, the processor 230 may analyze a season of the surrounding environment image using the AI algorithm and may determine a season (e.g., a summer, a winter, or the like) of the natural environment. The processor 230 may analyze a place of the surrounding environment image using the AI algorithm and may determine a type (e.g., a rocky mountain, a forest, a field, a beach, a riverside, a city, or the like) based on the analyzed result. The processor 230 may determine an additional natural environment element matched with a season and a type of the natural environment determined with reference to a lookup table. The processor 230 may access a 3D image (e.g., a small tree, a meadow, a flower garden, a rock, a hardwood, a conifer, or the like) of the determined natural environment element from the previously stored DB.

The processor 230 may randomly arrange the 3D image accessed from the DB on the front edge portion of the surrounding environment image. The processor 230 may analyze a change in surrounding environment image to estimate a movement direction, a speed, and the like of the first user U1. The processor 230 may rotate the added 3D image in proportion to the estimated movement direction, the estimated speed, and the like and may make a viewpoint of the added 3D image change together depending on the movement of the first user U1. The processor 230 may synthesize and prepare a correction image based on the first option selection information and a correction image based on the second option selection information. At the instant time, the processor 230 may perform an image synthesis using a generative adversarial network (GAN) algorithm.

The processor 230 may transmit the experience content corrected based on the first option selection information and the second option selection information to the VR player 300 through the communication circuit 210.

The VR player 300 may play a surrounding environment image, which is experienced by the first user U1 as the second user U2 downloads a recording file, a surrounding environment sound, and a response image of the first user U1 on a VR screen and may correct the image and the sound. Thus, the VR player 300 may allow a more realistic sound, a more realistic image, and a response of a specific person to be felt together.

The transaction server 400 may be connected to the data processing device 200 over a wired and/or wireless communication network to mediate an experience content transaction between the first user U1 and the second user U2. Although not illustrated in the drawing, the transaction server 400 may include a communication circuit which assists in communication with the data processing device 200 and the NFT transformation server 500. Furthermore, the transaction server 400 may include a processor for processing a content transaction depending on a predetermined experience content transaction process, a memory for storing instructions executed by the processor, and the like. The memory may separately store experience content for sale.

When receiving a request to digitally assetize experience content from the transaction server 400, the NFT transformation server 500 may transform the experience content into an NFT and may digitally assetize the NFT. The NFT transformation server 500 may assign a unique recognition value to the experience content which is a digital asset and may record the assigned unique recognition value in a blockchain. Furthermore, the NFT transformation server 500 may record an owner of the experience content in the blockchain.

Figure 2:
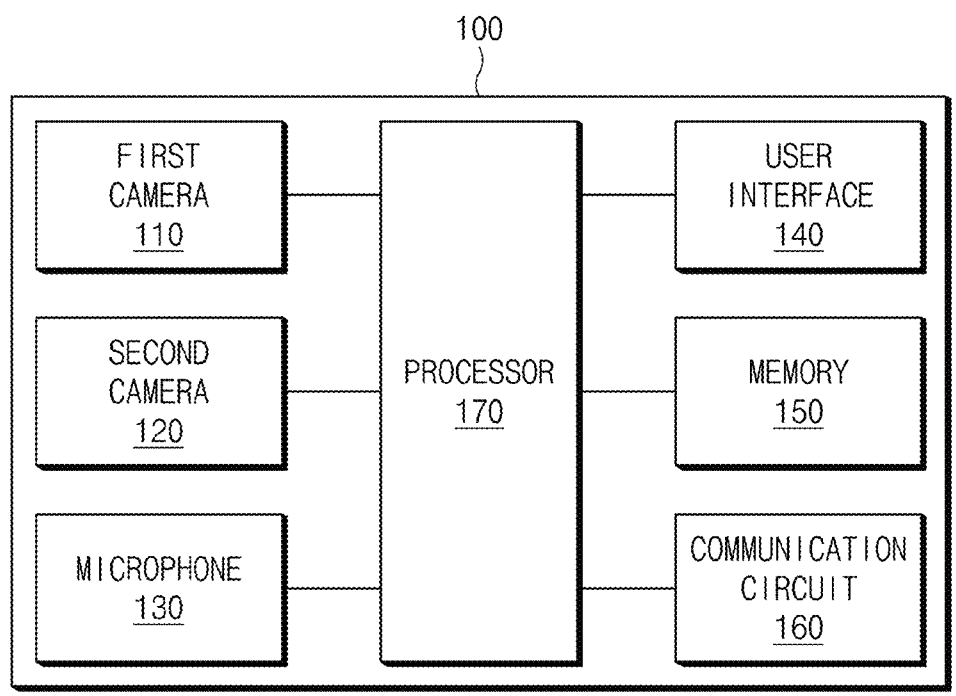
FIG. 2 is a block diagram illustrating a configuration of a VR recorder according to various exemplary embodiments of the present disclosure.

FIG. 2 is a block diagram illustrating a configuration of a VR recorder 100 according to various exemplary embodiments of the present disclosure.

Referring to FIG. 2, the VR recorder 100 may include a first camera 110, a second camera 120, a microphone 130, a user interface 140, a memory 150, a communication circuit 160, and a processor 170.

The first camera 110 may capture an external image. In other words, the first camera 110 may obtain a surrounding environment image of a user. The first camera 110 may include at least two or more small cameras provided at different positions.

The second camera 120 may capture user response image information. The second camera 120 may be provided to face the user who wears the VR recorder 100 and may capture a facial expression and/or an operation of the user. In other words, the second camera 120 may obtain a face image, an operation image, and/or the like of the user. The second camera 120 may include at least one small camera.

Each of the first camera 110 and the second camera 120 may include an image sensor, an image processor for performing image processing, such as noise cancellation, color reproduction, file compression, image quality adjustment, and saturation adjustment, for an image obtained by the image sensor.

The microphone 130 may record an external sound. The microphone 130 may include at least two or more small microphones provided at different positions. The microphone 130 may record a surrounding sound such as a surrounding environment sound of the user and/or a user voice.

The user interface 140 may receive user unique information for digital assetization. The user interface 140 may be implemented as a keyboard, a touch screen, a touch pad, a button, and/or the like for interaction with the user.

The memory 150 may store a surrounding environment image and a user response image captured by the first camera 110 and the second camera 120. The memory 150 may store a surrounding sound, that is, a surrounding environment sound and a user voice, which is recorded by the microphone 130. The memory 150 may be a storage medium which stores instructions executed by the processor 170. The memory 150 may include as at least one of storage media such as a flash memory, a hard disk, an SSD, a RAM, an SRAM, a ROM, a PROM, an EEPROM, or an EPROM.

The communication circuit 160 may support wired or wireless communication between the VR recorder 100 and an external device (e.g., a data processing device 200, a transaction server 400, or the like). The communication circuit 160 may include a wireless communication circuit (e.g., a Wi-Fi communication circuit, a Bluetooth communication circuit, an NFC circuit, a mobile communication circuit, and/or the like), a wired communication circuit (e.g., a LAN communication circuit, an Ethernet communication circuit, an ISDN communication circuit, and/or the like), and/or the like.

The processor 170 may control the overall operation of the VR recorder 100. The processor 170 may be implemented as at least one of processing devices such as an ASIC, a DSP, a PLD, an FPGA, a CPU, a microcontroller, or a microprocessor.

The processor 170 may record a user experience in a specific place. First of all, the processor 170 may obtain a face still image of a user (e.g., a first user U1 of FIG. 1) who does not wear the VR recorder 100 using the second camera 120 depending on a user input received through the user interface 140. At the instant time, the processor 170 may capture at least one of face images of the user.

The processor 170 may obtain a surrounding environment image of the user using the first camera 110. The processor 170 may record a surrounding sound of the user by the microphone 130. In other words, the processor 170 may obtain a surrounding environment sound of the user and a user voice. The processor 170 may obtain a user response image by the second camera 120. The user response image may include a facial expression, an operation, and the like of the user. The processor 170 may generate experience content using the surrounding environment image, the surrounding sound, and the user response image. At the instant time, the processor 170 may add unique information of the user to the experience content. The processor 170 may store the generated experience content in the memory 150. Furthermore, the processor 170 may transmit the generated experience content to the data processing device 200 through the communication circuit 160.

Figure 3:
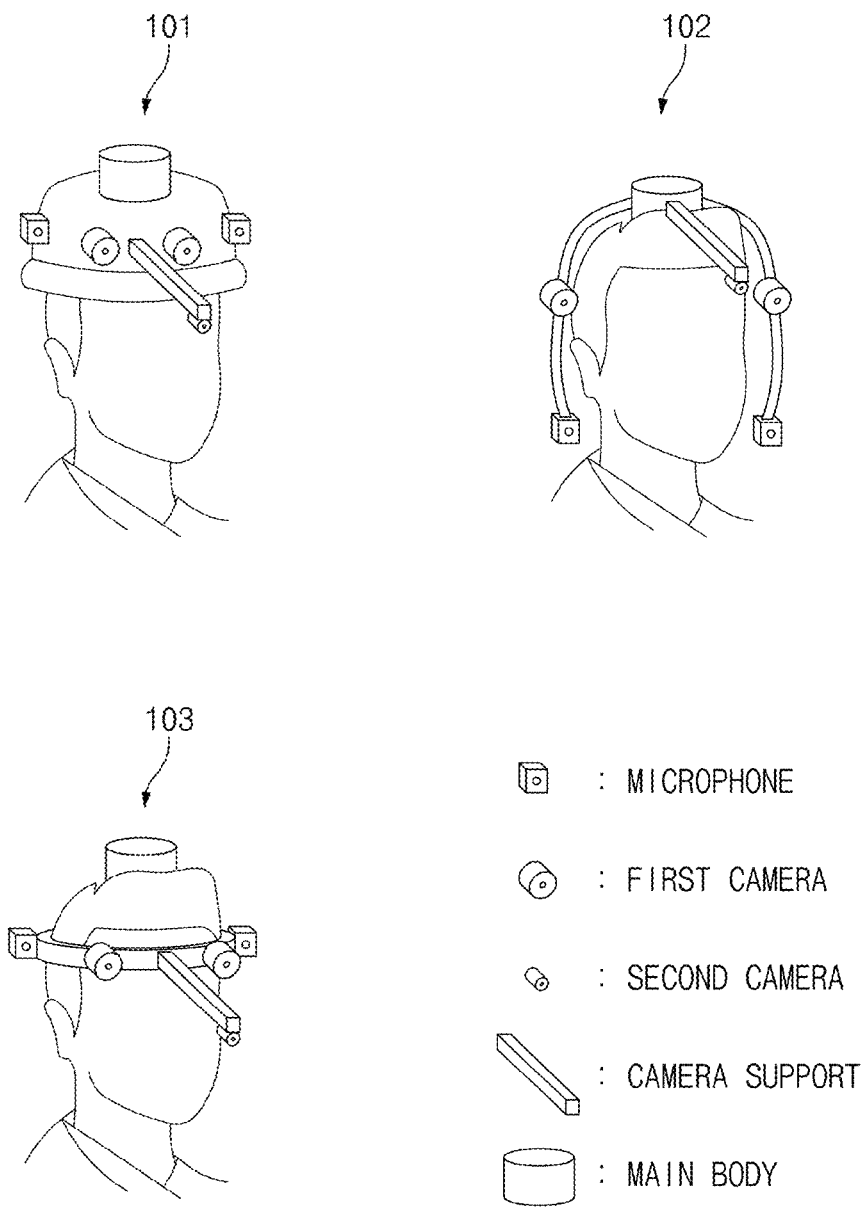
FIG. 3 is a drawing illustrating an example of implementing a VR recorder according to various exemplary embodiments of the present disclosure.

FIG. 3 is a drawing illustrating an example of implementing a VR recorder according to various exemplary embodiments of the present disclosure.

As shown in FIG. 3, a VR recorder 100 of FIG. 2 may be manufactured in a simple wearing shape such as a hat shape 101, a headphone shape 102, a headband shape 103, or the like. The VR recorder 100 should be in the shape of being small and light and being easily removable from a head, a forehead, or the like of a user. Furthermore, the VR recorder 100 may include at least two or more first cameras mounted on different positions to record a stereoscopic surrounding image. The first cameras may be a small camera. The VR recorder 100 may include a second camera provided in an end of a support facing the front of the user to record a realistic face response image of the user who records an image. Furthermore, the VR recorder 100 may include a microphone (or a small microphone) of at least two channels or more to record directional surrounding noise and a voice of a user (or a recorder).

Figure 4:
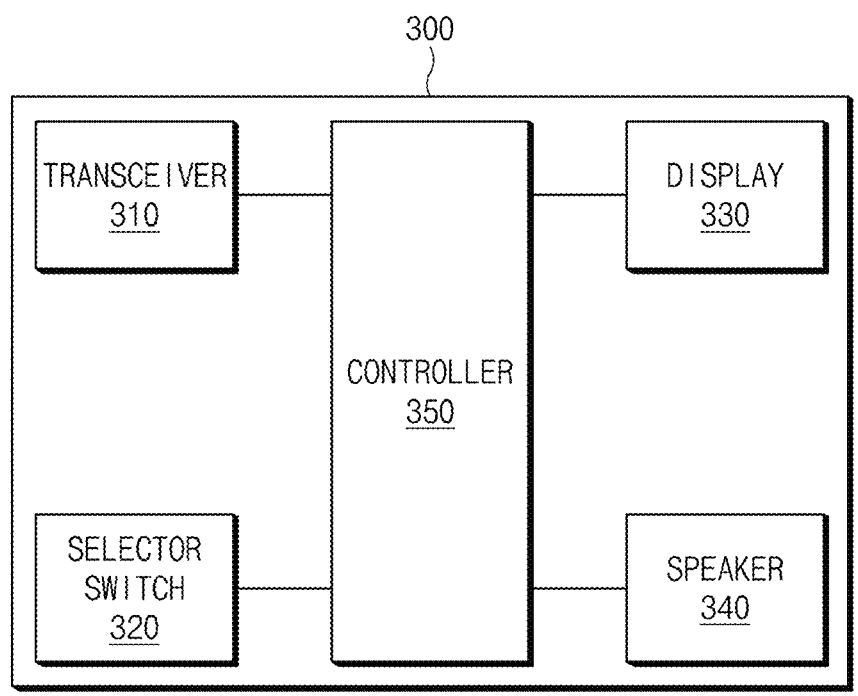
FIG. 4 is a block diagram illustrating a configuration of a VR player according to various exemplary embodiments of the present disclosure.
Figure 5:
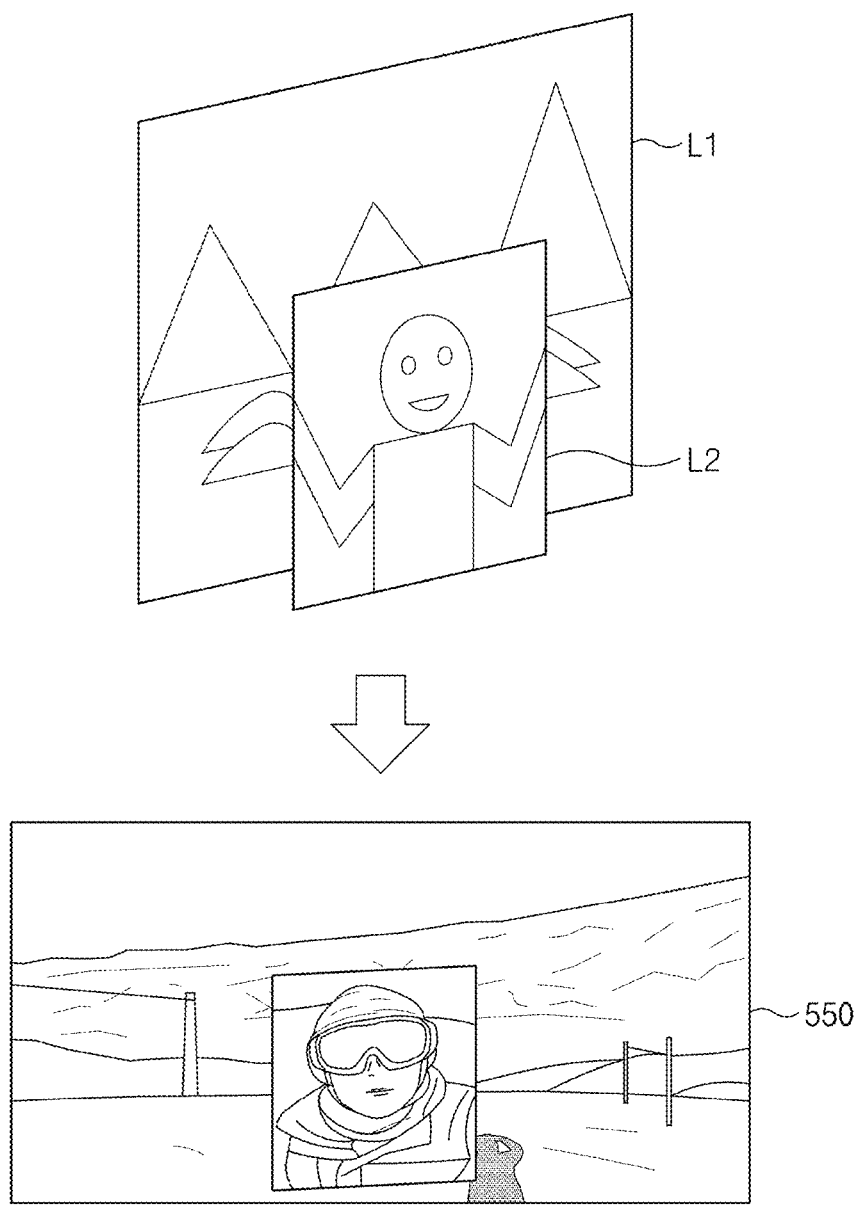
FIG. 5 and FIG. 6 are drawings illustrating an example of displaying an image according to various exemplary embodiments of the present disclosure.
Figure 6:
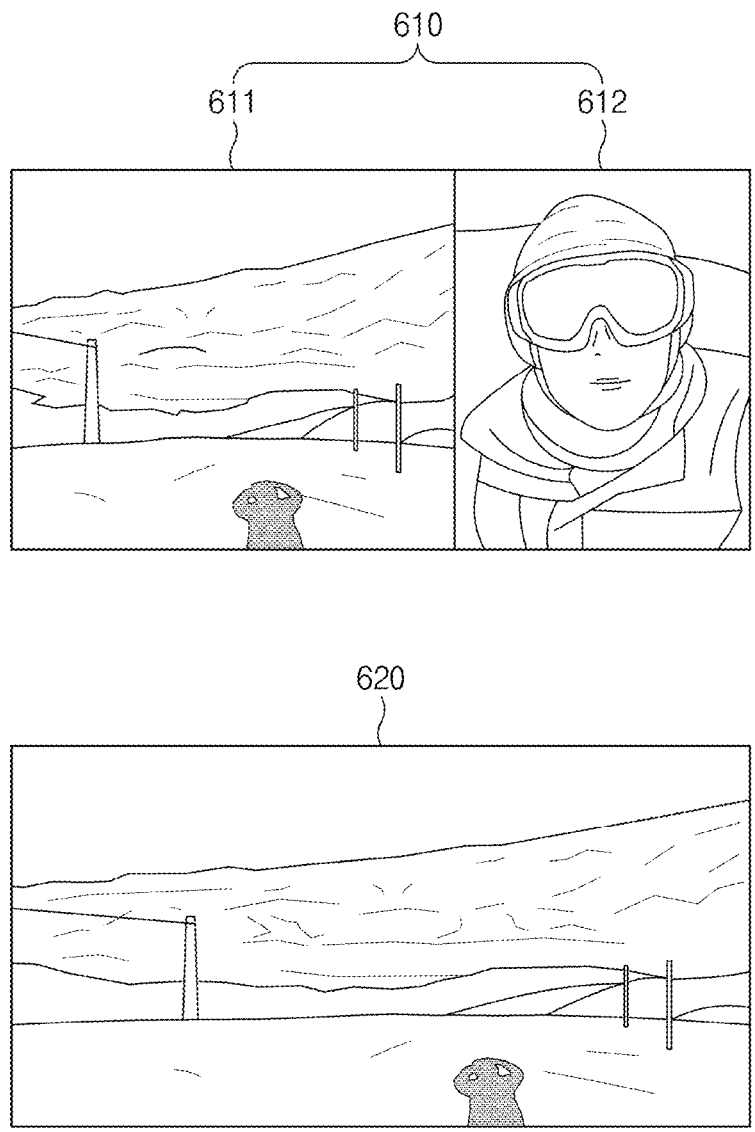

FIG. 4 is a block diagram illustrating a configuration of a VR player according to various exemplary embodiments of the present disclosure. FIG. 5 and FIG. 6 are drawings illustrating an example of displaying an image according to various exemplary embodiments of the present disclosure.

A VR player 300 may be a display device for vehicle, an HMD, or the like. The VR player 300 may include a transceiver 310, a selector switch 320, a display 330, a speaker 340, a controller 350, and the like.

The transceiver 310 may support wired or wireless communication between the VR player 300 and an external device (e.g., a data processing device 200, a transaction server 400, or the like of FIG. 1). The transceiver 310 may transmit or receive data (or information) under an instruction of the controller 350.

The selector switch 320 may be a user interface used so that the user selects an option. The selector switch 320 may be implemented as a physical switch, a touch switch, or the like.

The display 330 may output a playback screen of experience content. The display 330 may display at least one of the played surrounding environment image or the played user response image. The display 330 may segment a screen into at least two or more display areas under an instruction of the controller 350. The display 330 may display a different image on each of the segmented display areas. The display 330 may three-dimensionally represent a surrounding environment image using an existing well-known 3D display technology. The display 330 may include at least one of display means such as an organic light-emitting diode (OLED) display, a flexible display, a 3D display, a transparent display, or a touch screen.

The speaker 340 may output a playback sound of experience content. The speaker 340 may output the played surrounding sound to the outside. The speaker 340 may directionally represent a surrounding sound using a spatial sound function. An existing well-known technology may be used as the spatial sound function.

The controller 350 may be electrically connected to the transceiver 310, the selector switch 320, the display 330, and the speaker 340. The controller 350 may control the overall operation of the VR player 300. The controller 350 may include at least one processor, a memory, and the like.

The controller 350 may select at least one of pieces of experience content stored in storage 220 of the data processing device 200 depending on the input of a user (e.g., a second user U2 of FIG. 1), which is received from the selector switch 320.

The controller 350 may select a first option and a second option based on data (or a signal) transmitted from the selector switch 320. The first option may include a weather change, a time change, background sound addition, and/or the like. The second option may include addition of a background such as a crowd, a building, and/or a natural environment element.

The controller 350 may transmit experience content selection information, first option selection information, and second option selection information to the data processing device 200 through the transceiver 310. The controller 350 may receive experience content corrected based on the first option selection information and the second option selection information transmitted from the data processing device 200 through the transceiver 310.

The controller 350 may play the received experience content. The controller 350 may play and display a surrounding environment image and/or a user response image of the experience content on the display 330. At the instant time, the controller 350 may display an image depending on a predetermined display mode. Herein, the display mode may be divided into an integrated mode, a segmentation mode, and a single mode depending on a manner which displays the surrounding environment image and the user response image. As an exemplary embodiment of the present disclosure, when the display mode is set to the integrated mode, as shown in FIG. 5, the controller 350 may arrange the surrounding environment image and the user response image on different layers L1 and L2, respectively. In other words, the controller 350 may arrange the surrounding environment image on the first layer L1 and may arrange the user response image on the second layer L2. The controller 350 may overlap and integrate the first layer L1 with the second layer L2 into one image 550 to display the one image 550 on the display 330. In the instant case, another user (e.g., the second user U2 of FIG. 1) may identify a response of the user together while seeing the surrounding environment image. As an exemplary embodiment of the present disclosure, when the display mode is set to the segmentation mode, the controller 350 may divide a screen 610 of the display 330 into two and may display the surrounding environment image and the user response image on the two divided display areas 611 and 612, respectively (refer to FIG. 6). As an exemplary embodiment of the present disclosure, when the display mode is set to the single mode, the controller 350 may play and display only a surrounding environment image 620 except for a user response image on the display 330 alone. Furthermore, the controller 350 may play and output a surrounding sound to the outside through the speaker 340 when playing the experience content.

Figure 7:
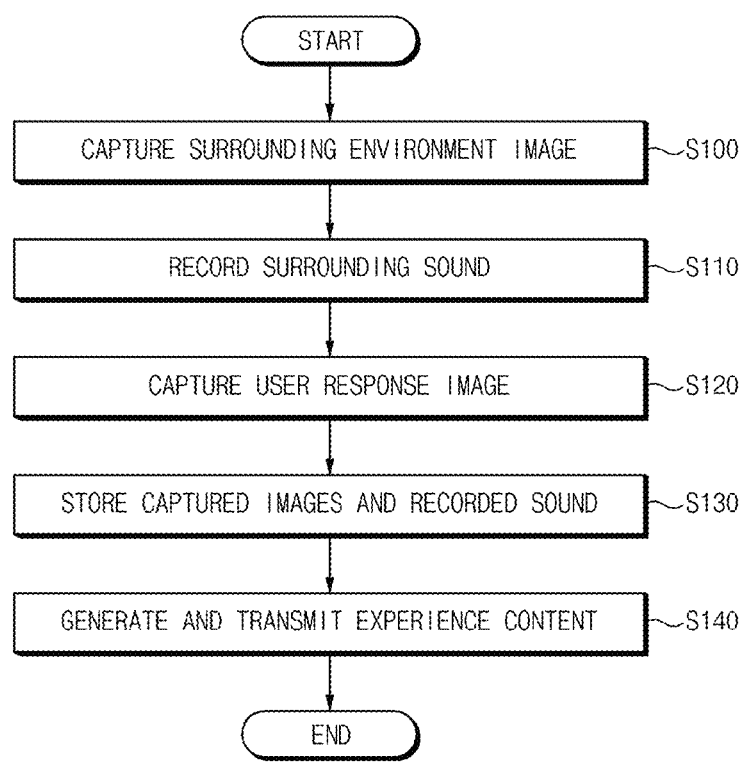
FIG. 7 is a flowchart illustrating a VR recording process according to various exemplary embodiments of the present disclosure.

FIG. 7 is a flowchart illustrating a VR recording process according to various exemplary embodiments of the present disclosure.

A VR recording process according to the exemplary embodiment may be performed by a processor 170 of a VR recorder 100 shown in FIG. 2.

In S100, the processor 170 may capture a surrounding environment image of a user (e.g., a first user U1 of FIG. 1) by a first camera 110 of FIG. 2. In other words, the processor 170 may capture a surrounding environment of the user while the user performs an experience in a specific place, by the first camera 110.

In S110, the processor 170 may record a surrounding sound using a microphone 130 of FIG. 2. The processor 170 may record a surrounding environment sound of the user, a user voice, and the like by the microphone 130 when capturing the surrounding environment image.

In S120, the processor 170 may capture a user response image, such as a facial expression and/or an operation of the user, by a second camera 120 of FIG. 2. The processor 170 may record a change in the facial expression of the user, a change in the operation of the user, and/or the like according to the experience in the specific place as a user response image using the second camera 120.

In S130, the processor 170 may store the captured surrounding environment image, the captured user response image, and the recorded surrounding sound in a memory 150 of FIG. 2. The processor 170 may separately store the surrounding environment image, the user response image, and the surrounding sound in difference spaces in the memory 150.

In S140, the processor 170 may generate and transmit experience content using the surrounding environment image, the user response image, and the surrounding sound. When generating the experience content, the processor 170 may add unique information of the user to the experience content. The processor 170 may transmit the experience content to a data processing device 200 of FIG. 1 through a communication circuit 160 of FIG. 2.

The exemplary embodiment describes that the capturing of the surrounding environment image, the recording of the surrounding sound, and the capturing of the user response image are sequentially performed, but this is to help understand the present disclosure and is not limited thereto. The capturing of the surrounding environment image, the recording of the surrounding sound, and the capturing of the user response image are executed at the same time.

Figure 8:
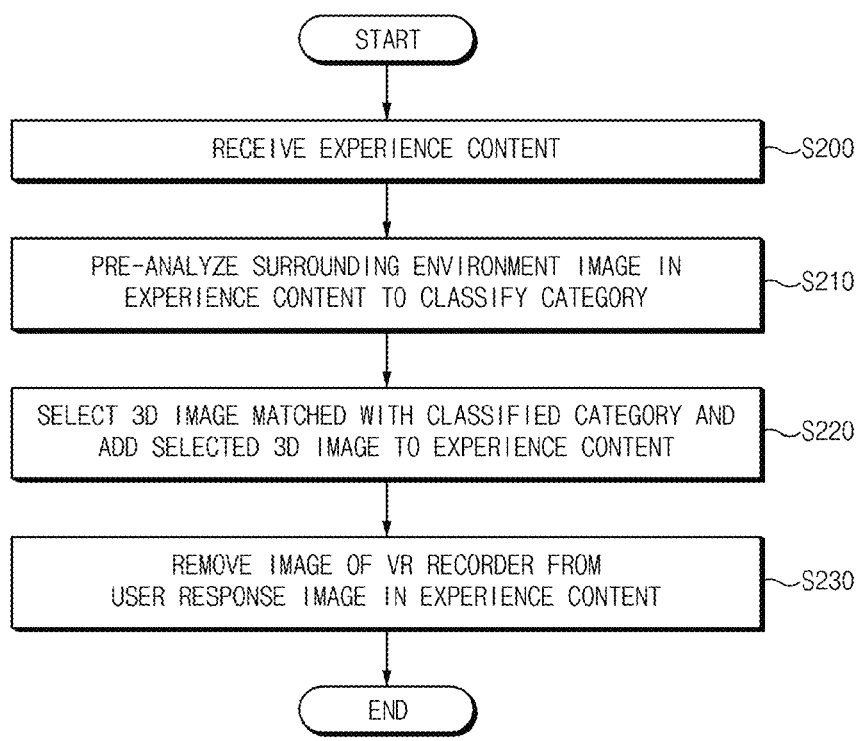
FIG. 8 is a flowchart illustrating a process of uploading experience content in a data processing device according to various exemplary embodiments of the present disclosure.

FIG. 8 is a flowchart illustrating a process of uploading experience content in a data processing device according to various exemplary embodiments of the present disclosure.

In S200, a processor 230 of a data processing device 200 of FIG. 1 may receive experience content transmitted from a VR recorder 100 of FIG. 1 through a communication circuit 210 of FIG. 1. The data processing device 200 may receive experience content generated based on a surrounding environment image and a user response image recorded by the VR recorder 100 and a surrounding sound recorded by the VR recorder 100. The data processing device 200 may store the received experience content in storage 220 of FIG. 1.

In S210, the processor 230 may pre-analyze the surrounding environment image in the experience content to classify a category. The processor 230 may perform a pre-analysis using a pre-trained AI algorithm. The processor 230 may classify a season, a place type, and the like in the surrounding environment image by the pre-analysis of the surrounding environment image (or a background screen of the experience content). Herein, the place type may be classified as a snow-capped mountain, a green mountain, a rocky mountain, a field, a city, a beach, or a riverside.

In S220, the processor 230 my select a 3D image matched with the classified category from a 3D image DB and may add the selected 3D image to the experience content. The processor 230 may select a 3D image including a crowd dressed in clothing suitable for the classified season and place, a building suitable for the classified place, or a natural environment element suitable for the classified season and/or place and may add the selected 3D image to the experience content. The processor 230 may store the experience content to which the selected 3D image is added in the storage 220.

In S230, the processor 230 may remove an image of the VR recorder 100 of the user from the user response image in the experience content. The processor 230 may store the experience content in which the image of the VR recorder 100 of the user is removed in the storage 220.

Figure 9:
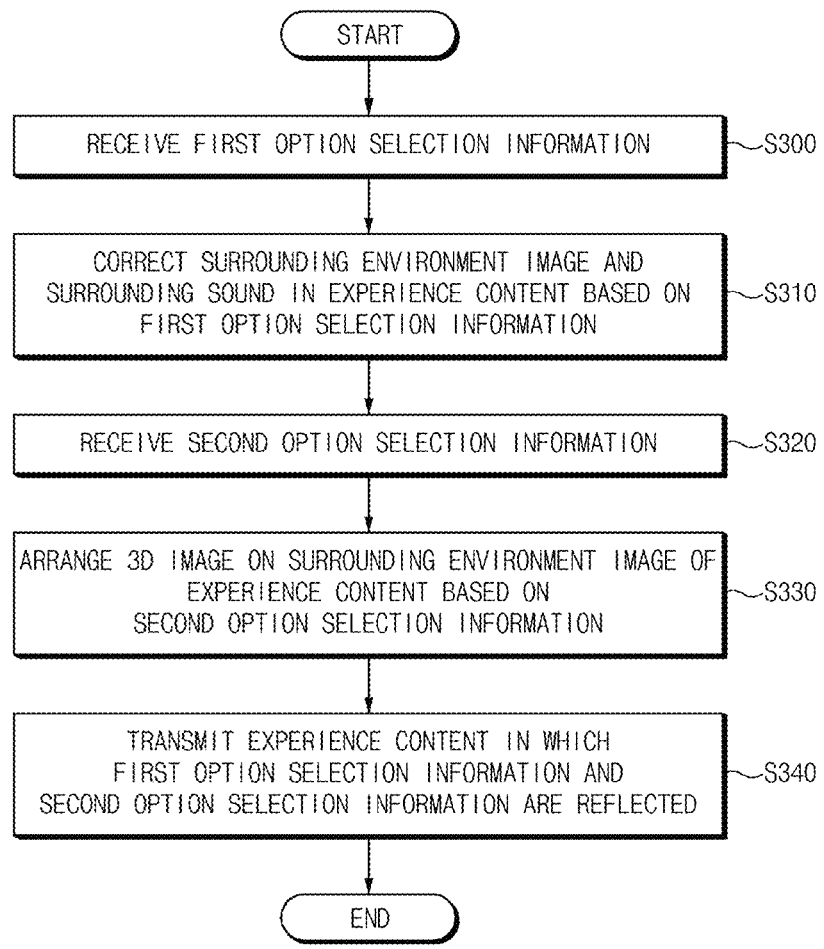
FIG. 9 is a flowchart illustrating a process of downloading experience content in a data processing device according to various exemplary embodiments of the present disclosure.

FIG. 9 is a flowchart illustrating a process of downloading experience content in a data processing device according to various exemplary embodiments of the present disclosure.

A description will be provided of a process of downloading experience content selected by a user (e.g., a second user U2 of FIG. 1) in an exemplary embodiment of the present disclosure.

In S300, a processor 230 of a data processing device 200 of FIG. 1 may receive first option selection information from a VR player 300 of the user. Herein, the first option selection information may include information associated with a weather change, a time change, and/or background sound addition.

In S310, the processor 230 may correct a surrounding environment image and a surrounding sound in the experience content based on the first option selection information.

In S320, the processor 230 may receive second option selection information from the VR player 300. The second option selection information may be selected by the user, which may include information related to the addition of a background such as a crowd, a building, and/or a natural environment element.

In S330, the processor 230 may arrange a 3D image based on the second option selection information on the surrounding environment image of the experience content using an AI algorithm. In other words, the processor 230 may arrange 3D image(s) of a crowd, a building, and/or a natural environment according to the second option selection information on the surrounding environment image.

In S340, the processor 230 may transmit experience content in which the first option selection information and the second option selection information are reflected to the VR player 300.

Figure 10:
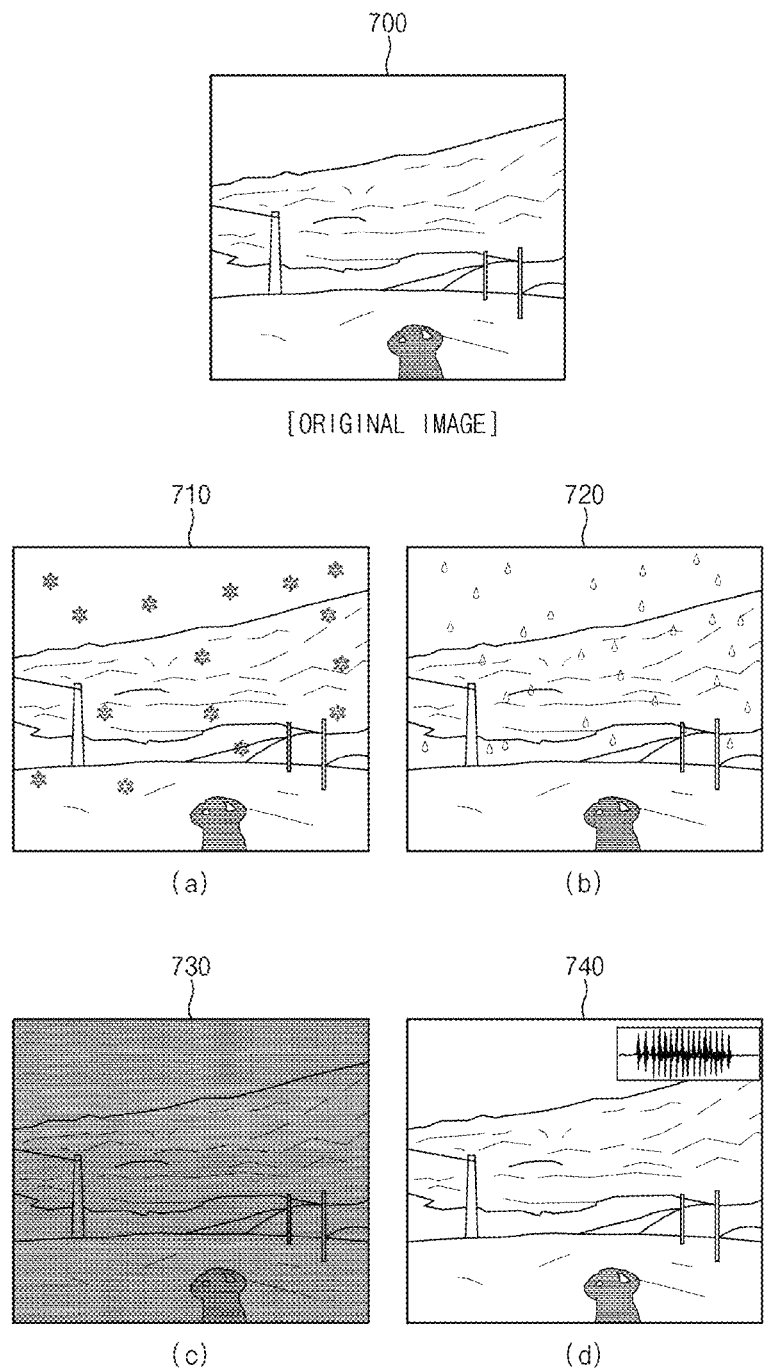
FIG. 10 is a drawing illustrating an example of correcting experience content according to various exemplary embodiments of the present disclosure.

FIG. 10 is a drawing illustrating an example of correcting experience content according to various exemplary embodiments of the present disclosure.

Referring to FIG. 10, a processor 230 of a data processing device 200 of FIG. 1 may access an original surrounding environment image 700 of experience content selected by a user from an experience content DB in storage 220 of FIG. 1. The processor 230 may modify (or correct) the original surrounding environment image 700 and an original surrounding sound based on weather change information, time change information, background sound addition information, and/or the like which are/is first option selection information received from the VR player 300.

First of all, the processor 230 may select an image, brightness, a background sound source, and the like to be added, based on the first option selection information. Furthermore, the processor 230 may reflect the selected image, the selected brightness, and the selected background sound source to be added in the experience content.

As an exemplary embodiment of the present disclosure, the processor 230 may add a snow image to the original surrounding environment image 700 depending on the first option selection information to correct the original surrounding environment image 700 to a background screen 710 of snowy weather.

As an exemplary embodiment of the present disclosure, the processor 230 may add a rain image to the original surrounding environment image 700 depending on the first option selection information to correct the original surrounding environment image 700 to a background screen 720 of rainy weather.

As an exemplary embodiment of the present disclosure, the processor 230 may adjust a brightness of the original surrounding environment image 700 based on time information included in the first option selection information and may output an image 730, the brightness of which is adjusted.

As an exemplary embodiment of the present disclosure, the processor 230 may select addition of a soundscape, such as a sound of thunder, a sound of rain, and/or a sound of bird, depending on the first option selection information to add the soundscape to the original surrounding environment image 700. The processor 230 may output an image 740 to which the soundscape is added.

Figure 11:
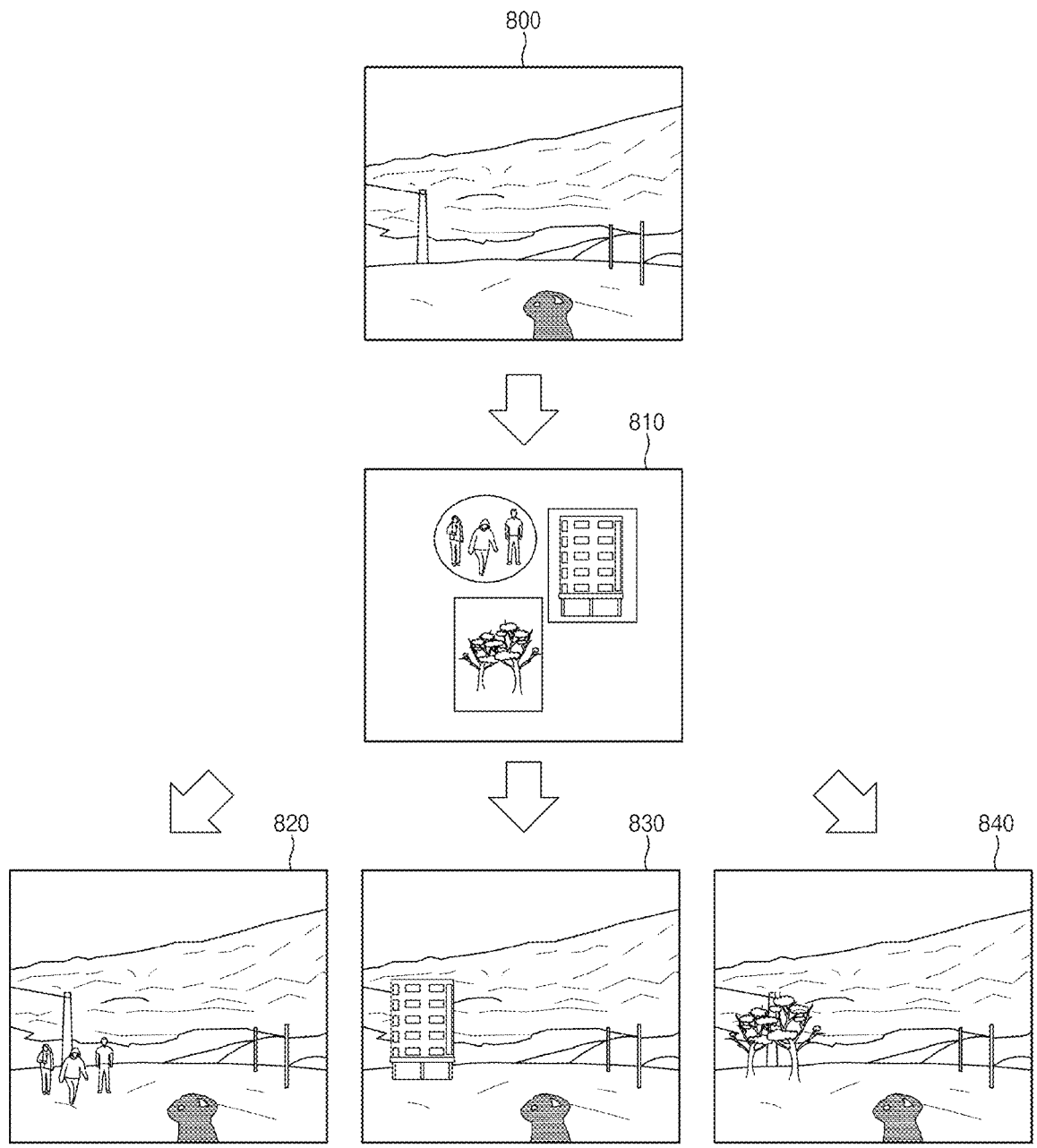
FIG. 11 is a drawing illustrating another example of correcting experience content according to various exemplary embodiments of the present disclosure.

FIG. 11 is a drawing illustrating another example of correcting experience content according to various exemplary embodiments of the present disclosure.

Referring to FIG. 11, a processor 230 of a data processing device 200 of FIG. 1 may access an original surrounding environment image 800 of experience content selected by a user from an experience content DB in storage 220 of FIG. 1. The processor 230 may select a 3D image 810 to be added, based on second option selection information, for example, a crowd, a building, a natural environment (or a natural environment element), which is received from a VR player 300 of FIG. 1.

The processor 230 may select a size of the selected 3D image 810, a location in a surrounding environment image, and the like based on the original surrounding environment image 800. Furthermore, the processor 230 may synchronize a viewpoint of the 3D image 810 with a change in viewpoint of the original surrounding environment image 800 and may apply a change over time.

As an exemplary embodiment of the present disclosure, when selecting a crowd image according to the second option selection information, the processor 230 may add the selected crowd image to the original surrounding environment image 800 to generate a background image 820.

As an exemplary embodiment of the present disclosure, when selecting a building image depending on the second option selection information, the processor 230 may add the selected building image to the original surrounding environment image 800 to generate a background image 830.

As an exemplary embodiment of the present disclosure, when selecting a natural environment image depending on the second option selection information, the processor 230 may add the selected natural environment image to the original surrounding environment image 800 to generate a background image 840.

Figure 12:
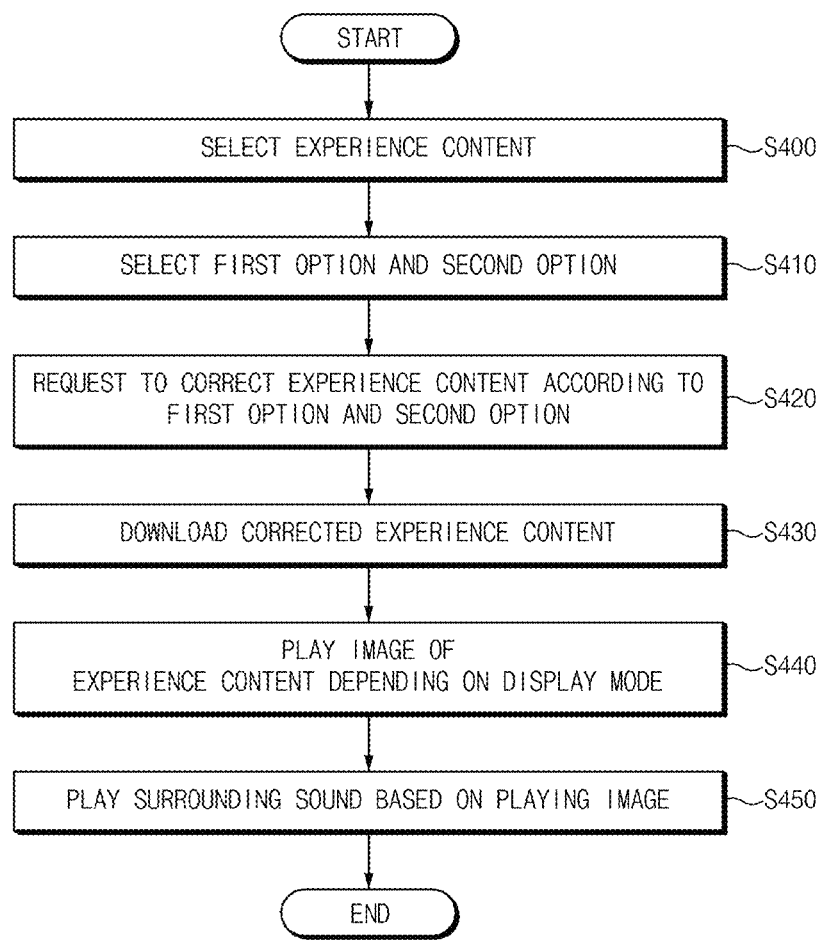
FIG. 12 is a flowchart illustrating an operation process of a VR player according to various exemplary embodiments of the present disclosure.

FIG. 12 is a flowchart illustrating an operation process of a VR player according to various exemplary embodiments of the present disclosure. The case where experience content of a first user U1, which is selected by a second user U2 shown in FIG. 1, is played is referred to as an example in an exemplary embodiment of the present disclosure.

In S400, a controller 350 of a VR player 300 of FIG. 4 may select one of pieces of experience content of the first user U1, which are registered with a data processing device 200 of FIG. 1 depending on the input of the second user U2.

In S410, the controller 350 may select a first option and a second option using a selector switch 320 of FIG. 4. The controller 350 may generate first option selection information and/or second option selection information based on data (or a signal) transmitted from the selector switch 320.

In S420, the controller 350 may request the data processing device 200 to correct experience content according to the selected first option and the selected second option. When requesting to correct the experience content, the controller 350 may transmit the first option selection information and/or the second option selection information together with experience content selection information. The data processing device 200 may correct a surrounding environment image and a surrounding sound in the experience content through a procedure shown in FIG. 9 depending on the request of the controller 350.

In S430, the controller 350 may download the experience content corrected by the data processing device 200. The controller 350 may receive an experience content revision transmitted from the data processing device 200 through a transceiver 310 of FIG. 4.

In S440, the controller 350 may play an image of the experience content depending on a display mode of the VR player 300. The controller 350 may play and output at least one of the surrounding environment image or the user response image in the experience content. When outputting the surrounding environment image and the user response image, the controller 350 may arrange the surrounding environment image and the user response image on different layers and may transparently overlap the layers with each other to integrate and display the surrounding environment image and the user response image on one screen, when the display mode is set to an integrated mode. When the display mode is set to a segmentation mode, the controller 350 may segment the screen into two and may display playback screens of the surrounding environment image and the user response image on the segmented display areas, respectively. When the display mode is set to a single mode, the controller 350 may play only the surrounding environment image except for the user response image and may display the surrounding environment image on the display 330 alone.

In S450, the controller 350 may play and output a surrounding sound together displaying the image. The surrounding sound may include a surrounding environment sound, a user voice, and the like.

Figure 13:
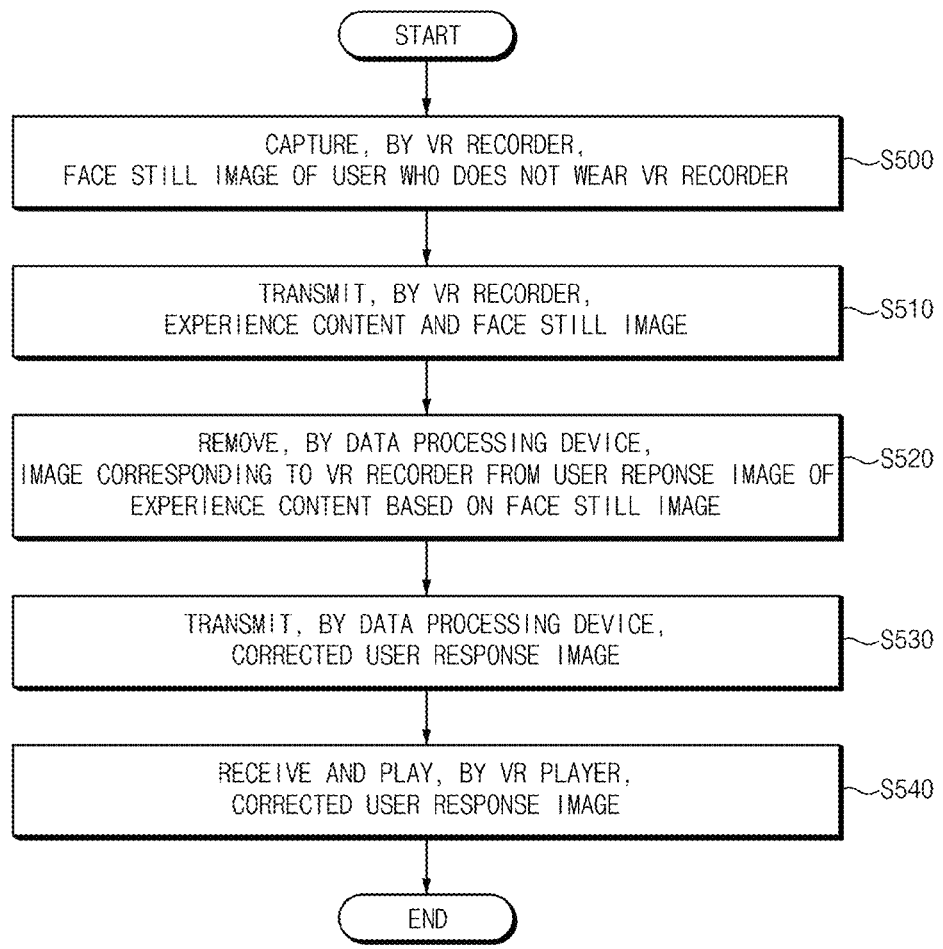
FIG. 13 is a flowchart illustrating a process of correcting a user response image according to various exemplary embodiments of the present disclosure.

FIG. 13 is a flowchart illustrating a process of correcting a user response image according to various exemplary embodiments of the present disclosure.

In S500, a VR recorder 100 of FIG. 1 may capture a face still image of a user (e.g., a first user U1 of FIG. 1) who does not wear the VR recorder 100.

In S510, the VR recorder 100 may transmit the face still image together when transmitting experience content to a data processing device 200 of FIG. 1.

In S520, the data processing device 200 may remove an image corresponding to the VR recorder 100 from a user response image of the experience content based on the face still image.

In S530, the data processing device 200 may transmit the user response image in which the VR recorder 100 is removed to a VR player 300 of FIG. 1.

In S540, the VR player 300 may receive and play the corrected user response image.

Figure 14:
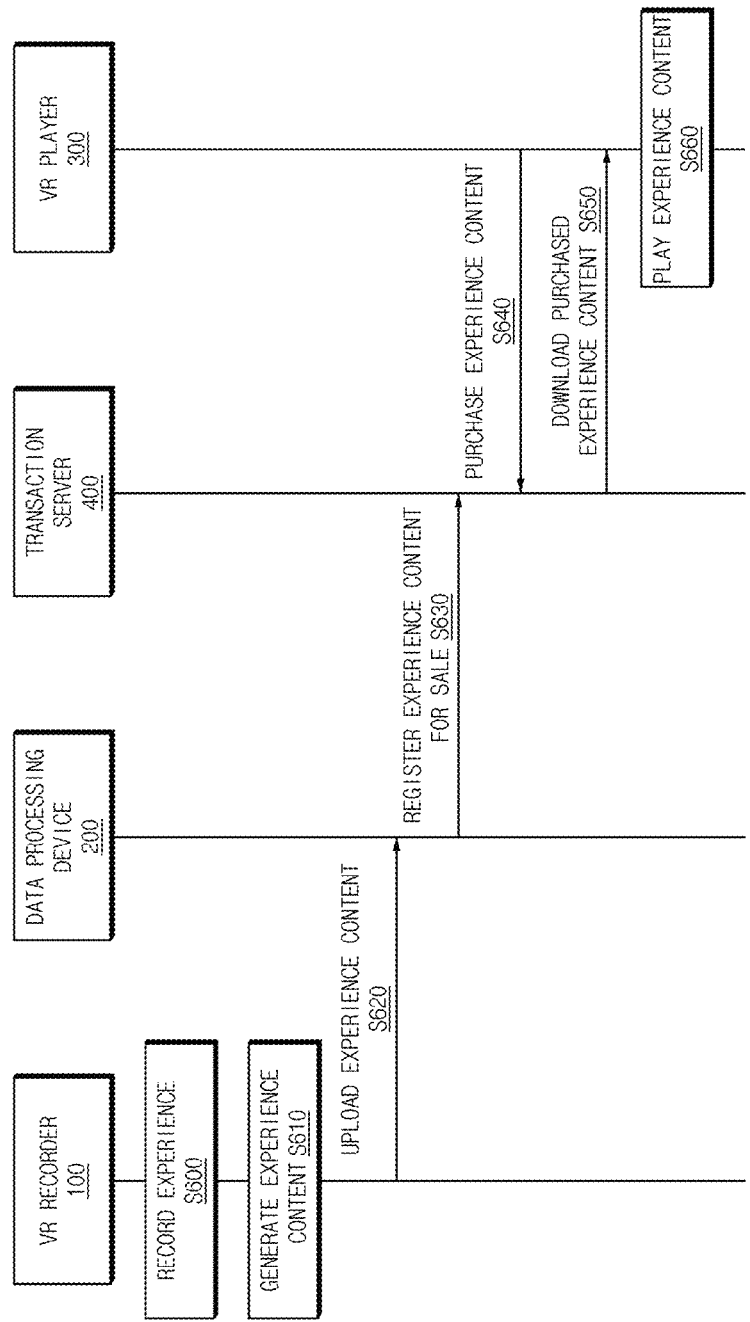
FIG. 14 is a signal sequence diagram illustrating a process of transacting experience content according to various exemplary embodiments of the present disclosure.

FIG. 14 is a signal sequence diagram illustrating a process of transacting experience content according to various exemplary embodiments of the present disclosure.

Referring to FIG. 14, in S600, a VR recorder 100 may record an experience of a first user U1. The VR recorder 100 may record a surrounding environment image, a user response image, and a surrounding sound using a first camera 110, a second camera 120, and a microphone 130 of FIG. 2.

In S610, the VR recorder 100 may generate experience content by a recording. The VR recorder 100 may generate experience content including the surrounding environment image, the user response image, and the surrounding sound. At the instant time, the VR recorder 100 may add unique information of the first user U1 to the experience content.

In S620, the VR recorder 100 may upload the experience content to a data processing device 200. The VR recorder 100 may transmit the generated experience content to the data processing device 200 through a communication circuit 160 of FIG. 2. The data processing device 200 may register the received experience content with an experience content DB in storage 220 of FIG. 1. At the instant time, the data processing device 200 may be a cloud server.

In S630, the data processing device 200 may register the uploaded experience content with a transaction server 400 of FIG. 1 for sale. The data processing device 200 may register the experience content as a content for sale with the transaction server 400 depending on the request of the first user U1. The transaction server 400 may interwork with an NFT transformation server 500 of FIG. 1 to transform the experience content requested for sale registration into an NFT and may digitally assetize and register (or store) the transformed NFT.

Thereafter, In S640, a VR player 300 may request the transaction server 400 to purchase experience content selected according to the input of a second user U2. At the instant time, the VR player 300 and the transaction server

400 may transact the experience content depending on a predetermined transaction procedure.

In S650, the VR player 300 may download the purchased experience content from the transaction server 400.

In S660, the VR player 300 may play the downloaded experience content. When playing the experience content, the VR player 300 may correct the surrounding environment image, the user response image, the surrounding sound, and the like of the experience content based on option information selected by the second user U2. Accordingly, the second user U2 may wear the VR player 300 to play the previously purchased experience content, thus performing the same experience as the first user U1 and feeling a response of the first user U1 in real time to share emotion with the first user U1.

The case where the VR player 300 directly accesses the transaction server 400 to purchase the experience content is described as an example in the above-mentioned embodiment, but the VR player 300 may be implemented to purchase experience content by the data processing device 200. For example, the data processing device 200 may purchase experience content according to the request of the VR player 300 in the transaction server 400 and may download the purchased experience content from the transaction server 400 to transmit the downloaded experience content to the VR player 300.

According to the above-mentioned embodiments, a celebrity (e.g., an actor/actress, a singer, an influencer, or the like) wants to have a different experience while looking at the wonderful scenery or to record and share his or her daily experiences, he or she may record it using the VR recorder 100 and may upload it to a sharing site or a selling site. When ordinary users want to share their experiences with celebrities or when they want to perform new experiences that they have not experienced on their behalf among various experience files, they may purchase their experience content (or experience files) to play the purchased experience content (or the purchased experience files) by the VR player 300.

Furthermore, a celebrity may expand his or her fan base by providing his or her fans with his or her own experiences and feelings, and may also generate revenue through the sale of experience content.

Furthermore, ordinary persons may feel the experiences and responses of the celebrity together and may strengthen their fan consciousness and may virtually experience different experiences in a wonderful place that they have not seen before (e.g., a skiing experience downhill on the highest grade slope, an experience falling from high altitude, an experience performing on stage, or the like) to feel vicarious satisfaction.

Furthermore, it is possible to generate a high value-added market by digitally assetizing the experience content in a non-fungible token (NFT) scheme.

According to various exemplary embodiments of the present disclosure, as a user such as a famous star or an influencer records his or her wonderful experiences in a special place (or a specific place) and other users receive and play the recording, they may share their experiences with each other.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An experience sharing system, comprising:
a virtual reality (VR) recorder configured to record a surrounding environment image, a user response image, and a surrounding sound of a first user using a camera and a microphone to generate experience content;
a VR player configured to play and provide the experience content to a second user; and
a data processing device connected to the VR recorder and the VR player over a communication network,
wherein the data processing device is configured to:
pre-analyze the experience content received from the VR recorder to classify a category;
add an image matched with the classified category to the experience content;
store the experience content to which the image matched with the classified category to the experience content is added in a database (DB);
access the experience content from the DB depending on a request of the VR player; and
transmit the accessed experience content to the VR player.

2. The experience sharing system of claim 1, wherein the user response image includes at least one of a facial expression or an operation of the first user.

3. The experience sharing system of claim 1, wherein the surrounding sound includes a surrounding environment sound and a voice of the first user.

4. The experience sharing system of claim 1, wherein the VR recorder is configured to add unique information of the first user to the experience content.

5. The experience sharing system of claim 1, wherein the data processing device is configured to classify a season and a place using an artificial intelligence (AI) algorithm.

6. The experience sharing system of claim 1, wherein the image matched with the classified category to the experience content includes a three-dimensional (3D) image for at least one of a crowd, a building, or a natural environment.

7. The experience sharing system of claim 1,
wherein the VR player is further configured to:
transmit experience content selection information, first option selection information, and second optional selection information by the second user to the data processing device, and wherein the data processing device is further configured to:
  correct the surrounding environment image and the surrounding sound of the experience content based on the first option selection information and the second option selection information; and
  transmit the corrected experience content to the VR player.

8. The experience sharing system of claim 7,
  wherein the first option selection information includes information associated with at least one of a weather change, a time change, or background sound addition, and
  wherein the second option selection information includes information associated with background addition.

9. The experience sharing system of claim 1, further including:
  a transaction server configured to register the experience content as content for sale depending on a request of the data processing device.

10. The experience sharing system of claim 9, further including:
  a non-fungible token (NFT) transformation server configured to transform the experience content registered as the content for sale into an NFT and digitally assetize the transformed NFT depending on a request of the transaction server.

11. An experience sharing method performed by a data processing device, comprising:
  receiving, by the data processing device, from a virtual reality (VR) recorder, experience content which is generated based on a surrounding environment image, a user response image, and a surrounding sound of a first user recorded by using a camera and a microphone of the VR recorder;
  pre-analyzing, by the data processing device, the experience content received from the VR recorder to classify a category;
  adding, by the data processing device, an image matched with the classified category to the experience content;
  storing, by the data processing device, the experience content to which the image matched with the classified category to the experience content is added in a database (DB);
  accessing, by the data processing device, the experience content from the DB depending on a request of a VR player; and
  transmitting, by the data processing device, the accessed experience content to the VR player, to play and provide,
  the experience content to a second user by using the VR player.

12. The experience sharing method of claim 11, wherein the user response image includes at least one of a facial expression or an operation of the first user.

13. The experience sharing method of claim 11, wherein the surrounding sound includes a surrounding environment sound and a voice of the first user.

14. The experience sharing method of claim 11, wherein the generating of the experience content includes:
  adding, by the VR recorder, unique information of the first user to the experience content.

15. The experience sharing method of claim 11, wherein the classifying of the category includes:
  classifying, by the data processing device, a season and a place using an artificial intelligence (AI) algorithm.

16. The experience sharing method of claim 11, wherein the image matched with the classified category to the experience content includes a 3D image for at least one of a crowd, a building, or a natural environment.

17. The experience sharing method of claim 11, wherein the transmitting to the VR player includes:
  transmitting, by the VR player, experience content selection information, first option selection information, and second option selection information by the second user to the data processing device;
  correcting, by the data processing device, the surrounding environment image and the surrounding sound of the experience content based on the first option selection information and the second option selection information; and
  transmitting, by the data processing device, the corrected experience content to the VR player.

18. The experience sharing method of claim 17,
  wherein the first option selection information includes information associated with at least one of a weather change, a time change, or background sound addition, and
  wherein the second option selection information includes information associated with background addition.

19. The experience sharing method of claim 11, further including:
  registering, by the data processing device, the experience content as a content for sale with a transaction server.

20. The experience sharing method of claim 19, further including:
  requesting, by the transaction server, a non-fungible token (NFT) transformation server to digitally assetize the experience content registered as the content for sale; and
  transforming, by the NFT transformation server, the experience content registered as the content for sale into an NFT.

21. A non-transitory computer readable medium containing program instructions executed by a data processing device, the computer readable medium storing:
  program instructions configured to:
  receive from a virtual reality (VR) recorder, experience content which is generated based on a surrounding environment image, a user response image, and a surrounding sound of a first user recorded by using a camera and a microphone of the VR recorder;
  pre-analyze the experience content received from the VR recorder to classify a category;
  an image matched with the classified category to the experience content;
  the experience content to which the image matched with the classified category to the experience content is added in a database (DB);
  access the experience content from the DB depending on a request of a VR player; and
  transmit the accessed experience content to the VR player, to play and provide,
  the experience content to a second user by using the VR player.

* * * * *